US011891084B2

(12) United States Patent
Kim

(10) Patent No.: US 11,891,084 B2
(45) Date of Patent: Feb. 6, 2024

(54) VEHICLE AND VEHICLE DRIVING ASSISTANCE CONTROL METHOD

(71) Applicant: HL KLEMOVE CORP., Incheon (KR)

(72) Inventor: Hyeongtae Kim, Yongin-si (KR)

(73) Assignee: HL KLEMOVE CORP., Incheon (KR)

( * ) Notice: Subject to any disclaimer, the term of this patent is extended or adjusted under 35 U.S.C. 154(b) by 0 days.

(21) Appl. No.: 17/562,436

(22) Filed: Dec. 27, 2021

(65) Prior Publication Data

US 2022/0204014 A1 Jun. 30, 2022

(30) Foreign Application Priority Data

Dec. 28, 2020 (KR) .................. 10-2020-0185177

(51) Int. Cl.
*B60W 50/14* (2020.01)
*B60W 30/12* (2020.01)
*B60W 40/105* (2012.01)
*G06V 20/56* (2022.01)

(52) U.S. Cl.
CPC .......... *B60W 50/14* (2013.01); *B60W 30/12* (2013.01); *B60W 40/105* (2013.01); *G06V 20/588* (2022.01); *B60W 2050/143* (2013.01); *B60W 2050/146* (2013.01); *B60W 2540/223* (2020.02); *B60W 2552/53* (2020.02)

(58) Field of Classification Search
CPC ..... B60W 2050/143; B60W 2050/146; B60W 2540/223; B60W 2552/53; B60W 30/12; B60W 40/105; B60W 50/14; G06V 20/588

See application file for complete search history.

(56) References Cited

U.S. PATENT DOCUMENTS

| 2014/0222289 | A1* | 8/2014 | Fujishiro | ............... B60W 50/14 |
| | | | | 701/1 |
| 2018/0037216 | A1* | 2/2018 | Otake | ................... B60W 30/12 |
| 2018/0053414 | A1* | 2/2018 | Qin | ................... G08G 1/096758 |
| 2018/0253094 | A1* | 9/2018 | Chang | ................... G05D 1/0055 |
| 2018/0313663 | A1* | 11/2018 | Kobayashi | ............ B60W 50/14 |
| 2018/0345964 | A1* | 12/2018 | Fujii | ..................... B60W 50/14 |
| 2022/0105984 | A1* | 4/2022 | Kojo | ............... B60W 30/18163 |
| 2022/0234607 | A1* | 7/2022 | Hata | ................... B60W 60/001 |

FOREIGN PATENT DOCUMENTS

| KR | 10-2005-0001907 A | 1/2005 |
| KR | 10-2012-0053176 A | 5/2012 |

* cited by examiner

*Primary Examiner* — Mohamed Barakat
(74) *Attorney, Agent, or Firm* — Hauptman Ham, LLP

(57) ABSTRACT

Disclosed herein a driving assistance control method for a vehicle, the method includes the steps of releasing a lane following assist mode in response to that a predetermined first condition for releasing the lane following assist mode is satisfied while the vehicle is traveling in the lane following assist mode; starting a warning to notify the releasing of the lane following assist mode in response to the lane following assist mode is released; and terminating the warning in response to that a predetermined second condition for terminating the warning is satisfied after the warning is started.

18 Claims, 3 Drawing Sheets

(A)

(B)

(C)

VEHICLE AND VEHICLE DRIVING ASSISTANCE CONTROL METHOD

CROSS-REFERENCE TO RELATED APPLICATION(S)

This application claims the benefit of priority to Korean Patent Application No. 10-2020-0185177, filed on Dec. 28, 2020, the disclosure of which is incorporated herein by reference.

TECHNICAL FIELD

The disclosure relates to a vehicle, and to a driving assistance control of the vehicle.

BACKGROUND

In general, as vehicle control technologies develop, various studies for technologies regarding assisting a driver in driving have been ongoing.

For example, a Lane Following Assistant (LFA) is an operation mode that allows a vehicle to travel along the center of a lane. Such a LFA system requires an accurate lane recognition, and a lane recognition for traveling is performed based on a recognition for a lane of a road.

While a vehicle is driving in a lane following assist mode, the lane following assist control mode may be released for any particular reasons. In this case, a warning may be generated to inform a driver that the lane following assist mode is released.

However, if a lane following assist mode is frequently released for minor reasons, or if a warning is maintained for a long time every time the warning is generated along with the frequent release of the lane following assist mode, a driver becomes insensitive to the warning generated by the release of the lane-keeping assist mode, so that the driver may not aware of a risk.

SUMMARY

An aspect of the disclosure is direct to maintain properly a frequency of releasing a lane maintenance assist mode may by applying a condition for releasing the lane maintenance assist mode and a condition for generating a warning thereof at an appropriate level, and adjust appropriately a length of the warning generation time.

Additional aspects of the disclosure will be set forth in part in the description which follows and, in part, will be obvious from the description, or may be learned by practice of the disclosure.

In accordance with an aspect of the disclosure, a driving assistance control method for a vehicle, the method includes the steps of releasing a lane following assist mode in response to that a predetermined first condition for releasing the lane following assist mode is satisfied while the vehicle is traveling in the lane following assist mode; starting a warning to notify the releasing of the lane following assist mode in response to the lane following assist mode is released; and terminating the warning in response to that a predetermined second condition for terminating the warning is satisfied after the warning is started.

The predetermined first condition for releasing the lane following assist mode may include a predetermined traveling environment of the vehicle, excluding a driver's intention to release the lane following assist mode.

The predetermined first condition for releasing the lane following assist mode may include at least one of a lane non-recognition, a lane recognition reliability degradation, a failure to follow a preceding vehicle, a dissatisfaction with lane conditions, an activation of an automatic braking system, and a failure of steering system.

The predetermined first condition for releasing the lane following assist mode may include satisfying all conditions in which a driver releases his/her hands from a steering wheel (a hands-off state), a speed of the vehicle is equal to or greater than a predetermined speed, and the vehicle travels on a highway.

The predetermined second condition for terminating the warning may include that a predetermined time elapses after starting the warning.

The predetermined second condition for terminating the warning may include that a driver releases a steering wheel and then grabs the steering wheel again.

The predetermined second condition for terminating the warning may include that the vehicle stops traveling and stops.

The predetermined second condition for terminating the warning may include satisfying a re-entry condition of the lane following assist mode.

In accordance with another aspect of the disclosure, a vehicle includes a lane recognition sensor configured to recognize a lane of a road; a warning output means for outputting a warning; and a controller configured to: based on the result of lane recognition detected by the lane recognition sensor, release a lane following assist mode in response to that a predetermined first condition for releasing the lane following assist mode is satisfied while the vehicle is traveling in the lane following assist mode, start a warning to notify the releasing of the lane following assist mode in response to the lane following assist mode is released; and terminate the warning in response to a predetermined second condition for terminating the warning is satisfied after the warning is started.

The predetermined first condition for releasing the lane following assist mode may include a predetermined traveling environment of the vehicle, excluding a driver's intention to release the lane following assist mode.

The predetermined first condition for releasing the lane following assist mode may include at least one of a lane non-recognition, a lane recognition reliability degradation, a failure to follow a preceding vehicle, a dissatisfaction with lane conditions, an activation of an automatic braking system, and a failure of steering system.

The predetermined first condition for releasing the lane following assist mode may include satisfying all conditions in which a driver releases his/her hands from a steering wheel (a hands-off state), a speed of the vehicle is equal to or greater than a predetermined speed, and the vehicle travels on a highway.

The predetermined second condition for terminating the warning may include that a predetermined time elapses after starting the warning.

The predetermined second condition for terminating the warning may include that a driver releases a steering wheel and then grabs the steering wheel again.

The predetermined second condition for terminating the warning may include that the vehicle stops traveling and stops.

The predetermined second condition for terminating the warning may include satisfying a re-entry condition of the lane following assist mode.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
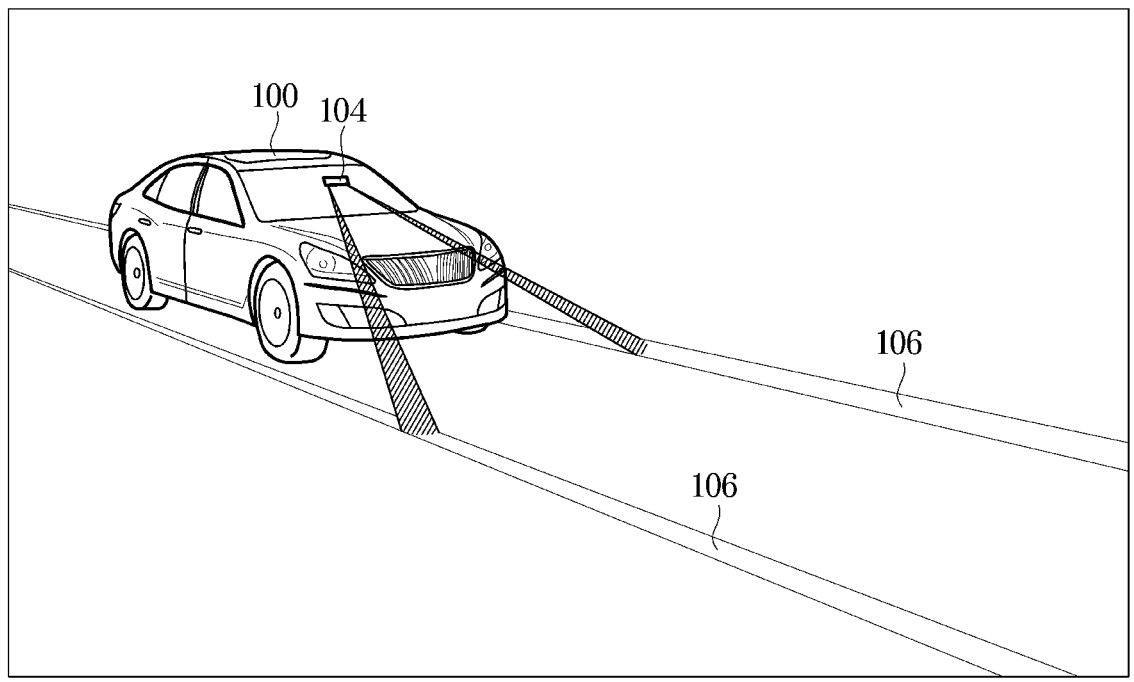
FIG. 1 is a view illustrating a lane following assist mode of a vehicle according to an embodiment of the disclosure.
Figure 1:
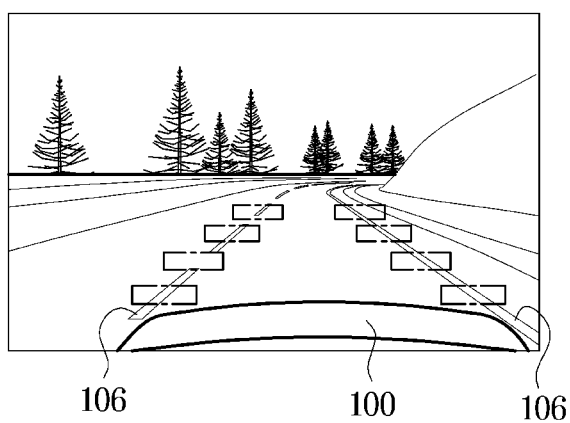
Figure 1:
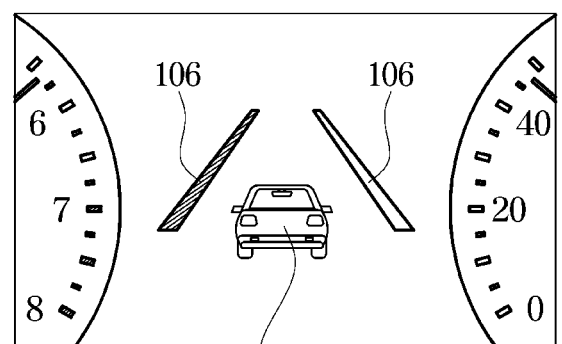

FIG. 1 is a view illustrating a lane following assist mode of a vehicle according to an embodiment of the disclosure.

A Lane Following Assistance (LFA) is an operation mode that allows a vehicle 100 to drive along the center of one lane divided into two lanes 106. The LFA is somewhat different from a Lane Keeping Assistance System (LKAS), which prevents a vehicle from leaving the lane 106, in that the LFA allows the vehicle 100 to travel along the center of the lane. In other words, the LKAS forces the vehicle not to deviate from the lane 106 only, but the LFA forces the vehicle not to deviate from the lane 106 as well as keep the center of the lane. Accordingly, the LKAS may be seen that it assists driving more actively.

The LFA detects the lane 106 to recognize a lane to be traveled, and allows the vehicle 100 to travel along the center of the lane. To this end, as shown in FIG. 1A, the lane 106 is detected by a lane detection sensor 104 provided in the vehicle 100. The lane detection sensor 104 may be a camera or a color recognition sensor. For the camera, as shown in FIG. 1B, the lane 106 may be detected through analysis of an image obtained by photographing in front of the vehicle 100. Alternatively, for the color recognition sensor, a white or yellow solid or dotted line may be detected as the lane 106 by using the lane 106 being white or yellow.

During an operation of the lane following assist mode, as shown in FIG. 1C, the vehicle 100 and the lane 106 are displayed in a cluster of the vehicle 100. In particular, a status position of the vehicle 100 for the lane 106 is displayed in the cluster, so that a driver may recognize whether the vehicle 100 is traveling along the center of the lane.

Figure 2:
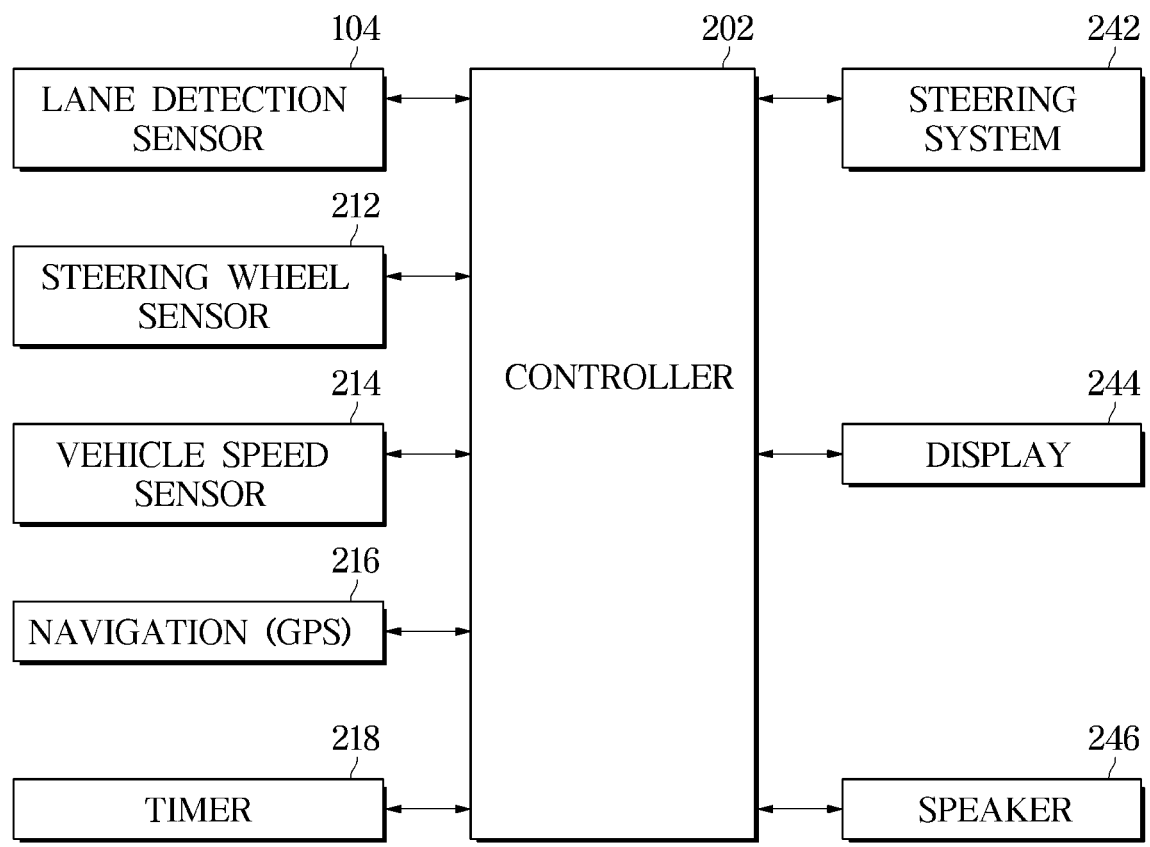
FIG. 2 is a view illustrating a control system of a vehicle according to an embodiment of an embodiment of the disclosure.

FIG. 2 is a view illustrating a control system of a vehicle according to an embodiment of the disclosure.

A controller 202 is provided to control overall operations of the vehicle 100. For example, the controller 202 may control the vehicle 100 to travel along the center of the lane in response to an activation of the lane following assist mode. Furthermore, the controller 202 may output a warning to notify the driver in response to that the lane following assist mode is released based on a predetermined traveling environment, and terminate output of the warning of the release of the lane following assist mode in response to that a predetermined condition for terminating the warning is satisfied.

The lane detection sensor 104 is provided to detect the lane of the road on which the vehicle 100 is traveling. The lane detection sensor 104 may be a camera or a color recognition sensor. For the camera, the lane 106 may be detected through an analysis of an image obtained by photographing in front of the vehicle 100. Alternatively, for the color recognition sensor, a white or yellow solid or dotted line may be detected as the lane 106 by using the lane 106 being white or yellow.

A steering wheel sensor 212 is provided to detect whether the driver is holding a steering wheel (i.e., a hands-on state). The steering wheel sensor 212 may be a capacitive sensor mounted on a steering wheel. In this case, it may be identified that the driver is holding the steering wheel from a change in capacitance of the capacitive sensor that occurs when the driver grips the steering wheel. Likewise, it may also detect when the driver takes their hands off the steering wheel (a hands-off state).

A vehicle speed sensor 214 is provided to measure the speed of the vehicle 100. The vehicle speed sensor 214 may be a wheel speed sensor for detecting a wheel speed of the vehicle 100.

A navigation system 216 is provided to guide a route for the vehicle 100 to move to a destination or output a warning for safe driving. In particular, the controller 202 may determine a type of road on which the vehicle 100 is currently traveling through the navigation 216. For example, the controller 202 may determine whether the road on which the vehicle 100 is currently traveling is a highway from map information of the navigation system 216. Furthermore, in response to the lane detection sensor 104 described above is a camera, the controller 202 may identify a road sign through the analysis of an image captured by the camera to determine whether the currently traveling road is a highway.

A timer 218 is provided to count a time that has elapsed since the warning for releasing of the lane following assist mode is started. The controller 202 may identify how much time has elapsed since the warning for releasing of the lane following assist mode is started by using the time counted by the timer 218. The timer 218 may be a timer embedded in the controller 202.

A steering system 242 is provided to control a traveling direction of the vehicle 100. The controller 202 may control the traveling direction of the vehicle 100 by driving the steering system 242. For example, in response to the lane following assist mode is activated, the controller 202 may control the traveling direction of the vehicle 100 by driving the steering system 242, so that the vehicle 100 may travel along the center of the lane.

A display 244, which is an example of a warning output means, is provided to visually display a variety of information generated while the vehicle 100 is traveling. For example, when the lane following assist mode is released, the controller 202 may visually output the warning for notifying it through the display 244.

A speaker 246, which is an example of a warning output means, is provided to output various information generated while the vehicle 100 is traveling in the form of an acoustic signal. For example, when the lane following assist mode is released, the controller 202 may output the warning in the form of an acoustic signal to notify the driver through the speaker 246.

Figure 3:
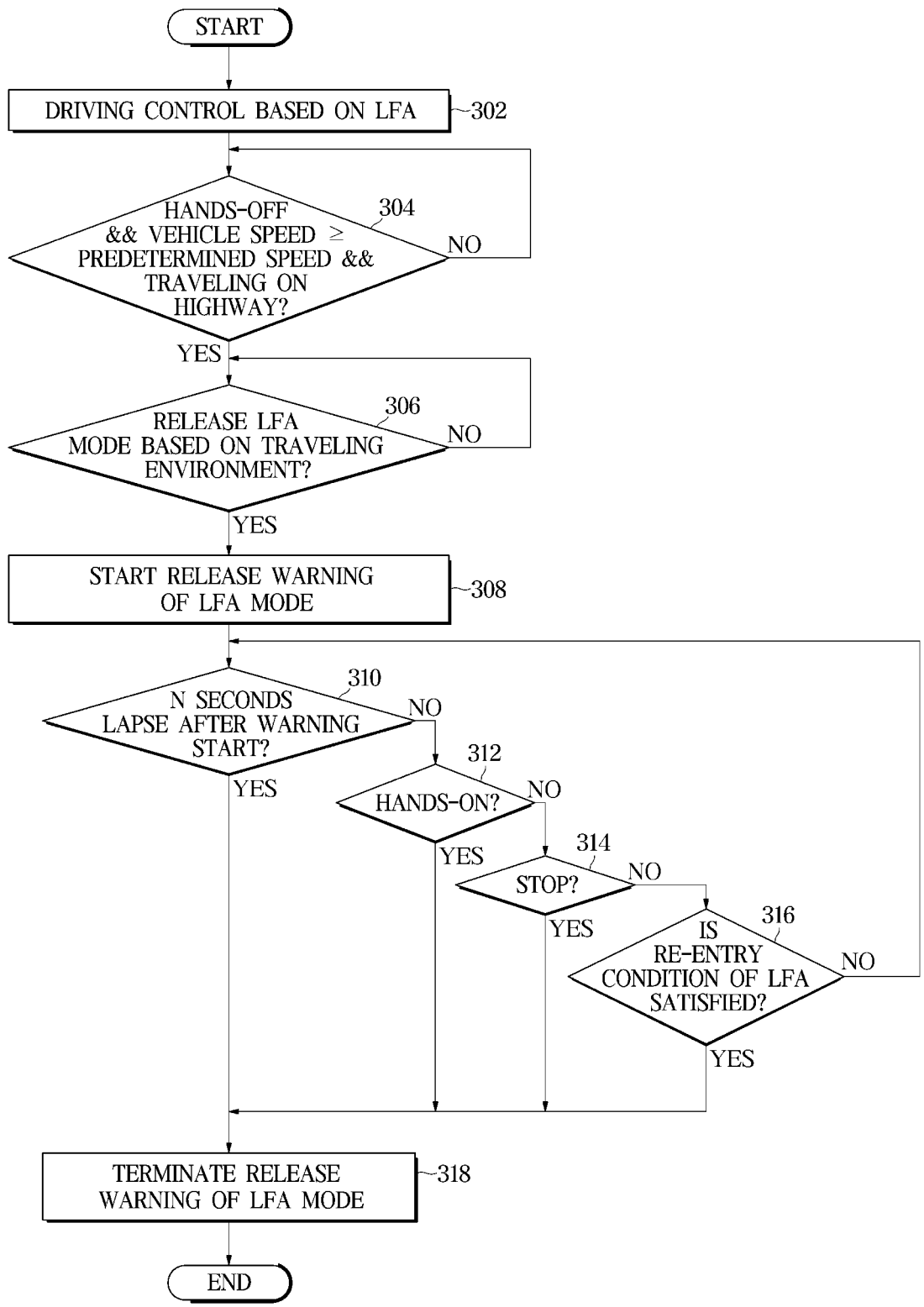
FIG. 3 is a view illustrating a method of controlling a lane following assist of a vehicle according to an exemplary embodiment of the disclosure.

FIG. 3 is a view illustrating a method of controlling a lane following assist of a vehicle according to an exemplary embodiment of the disclosure.

As shown in FIG. 3, in the vehicle 100, as the lane following assist mode is activated, a driving control based on the lane following assist mode is performed (in operation 302). In other words, the vehicle 100 travels along the center of the lane divided into two lanes 106.

During the vehicle 100 is traveling in the lane following assist mode, the controller 202 determines whether a traveling environment of the vehicle 100 satisfies all predetermined conditions in operations 304 and 306 of FIG. 3. The conditions in operations 304 and 306 of FIG. 3 may be a condition in which the warning for the releasing of the lane following assist mode of the vehicle 100 is started. In an embodiment of the disclosure, the warning for releasing of the lane following assist mode is generated in consideration of various predetermined conditions so that a frequency of warning occurrence is minimized by alerting the warning only if important and necessary.

First, the controller 202 identify whether i) the driver release his/her hands from the steering wheel, ii) the speed of the vehicle 100 is equal to or greater than a predetermined speed, and iii) the vehicle 100 is traveling on the highway (in operation 304).

In response to that all three conditions of operation 304 of FIG. 3 are satisfied while the vehicle 100 is traveling in a state in which the lane following assist mode is activated (YES in operation 304), the controller 202 identify whether the lane following assist mode of the vehicle 100 is released based on the predetermined traveling environment (in operation 306). Herein, the releasing of the lane following assist mode based on the 'traveling environment' refers to the release based on a state of the vehicle 100 and surrounding environments, not the release reflecting the driver's intention.

An example of traveling environments in which the lane following assist mode may be released is as follows.

<Release Based on Lane Non-Recognition>

If the lane recognition sensor 104 of the vehicle 100 does not operate normally and thus does not recognize the lane 106, the lane following assist mode of the vehicle 100 may be released because a lane recognition, which is a prerequisite for lane following, is impossible.

<Release Based on Lane Recognition Reliability Degradation>

If the lane recognition sensor 104 of the vehicle 100 operates normally, but the result of lane recognition is not sufficiently reliable because the lane 106 marked on the road is not clear or illuminance is low, the lane following assist mode of the vehicle 100 may be released.

<Release Based on Deviation Determination while Following Preceding Vehicle>

In the case of using a method of following the preceding vehicle instead of recognizing the lane for a lane following assist control, if the tracking of the preceding vehicle is impossible due to the deviation of the preceding vehicle, the lane following assist mode of the vehicle 100 may be released.

<Release Based on Lane Conditions (e.g., Lane Width or Curvature) Deviating Specification for Lane Following>

If the lane following assist control of the vehicle 100 is impossible due to the width of the lane on which the vehicle 100 is traveling being too narrow compared to the width (i.e., vehicle width) of the vehicle 100 or the curvature of the lane being too large (i.e., sharply curved), the lane following assist mode of the vehicle 100 may be released.

<Release Based on Excessive Lateral Acceleration>

If excessive lateral acceleration occurs for reasons such as a sliding in a lateral direction while the vehicle 100 is traveling, the lane following assist mode of the vehicle 100 may be released.

<Release Based on Automatic Brake System (ABS, TCS, ESC, Etc.) Operating>

When the brake systems are automatically operated while the vehicle 100 is traveling (ABS, TCS, ESC, etc.), the lane following assist mode of the vehicle 100 is released in order to give a priority over braking among braking and lane following. Herein, ABS refers to an Anti-lock Brake System, TCS refers to a Traction Control System, and ESC refers to an Electronic Stability Control.

<Release Based on Failure of Steering System>

To control the lane following of the vehicle 100, the traveling direction must be changed so that the vehicle 100 travels along the center of the lane. If the steering system 242 of the vehicle 100 does not operate normally (e.g. failure, error, and malfunction, etc.), the traveling direction of the vehicle 100 may not be controlled along the center of the lane, thereby the lane following assist mode of the vehicle 100 may be released.

<Release Based on Lane Deviation of Vehicle>

If the vehicle 100 deviates from the lane 106 for any reasons, the vehicle 100 may not be controlled to travel along the center of the lane, thereby the lane following assist mode of the vehicle 100 may be released.

As such, in response to that the state of the vehicle 100 and the surrounding environments satisfy both the conditions of operations 304 and 306 of FIG. 3 and the lane following assist mode of the vehicle 100 is released (YES in operation 306), the controller 202 generates the warning for notifying that the lane following assist mode has been released and outputs the warning through the display 244 or the speaker 246. Because the releasing of the lane following assist mode is caused by not the driver's intention to release but the traveling environments, it is necessary to generate the warning to notify the driver that the lane following assist mode of the vehicle 100 is released.

In an embodiment of the disclosure, the output of the warning for notifying the releasing of the lane following assist mode is continued from the time of occurrence until at least one of the conditions of operations 310 to 316 of FIG. 3 is satisfied. In other words, when at least one of the conditions 310 to 316 of FIG. 3 is satisfied after the start of the output of the warning for notifying the releasing of the lane following assist mode, the output is terminated. The conditions for determining the end time of the warning for notifying the releasing of the lane following assist mode are as follows.

<N Seconds Lapse after Warning Start>

In response to that a predetermined time (N seconds) has elapsed since the output of the warning for notifying the releasing of the lane following assist mode is started, the controller 202 terminates the output of the warning for notifying the releasing of the lane following assist mode of the vehicle 100. It is desirable for safety to output the warning for notifying the releasing of the lane following assist mode, but if the time for output of the warning is too long, the driver and passengers may feel fatigued about the warning. Accordingly, the warning is output only for an appropriate predetermined time and when the predetermined time elapses, the output of warning is terminated. As such, terminating the output of the warning at an appropriate time after the output of the warning for notifying the releasing of the lane following assist mode is started is to minimize a warning output time so that the driver and passengers do not feel fatigue due to the warning.

<Hands On>

When the driver releases his/her hands from the steering wheel, a release warning of the lane following assist mode is generated. Conversely, when the driver grips the steering wheel again to enter the state of hands-on, the controller 202 terminates the output of the warning for notifying the releasing of the lane following assist mode of the vehicle 100.

\<Stop\>

The operation of the lane following assist mode or the output of the release warning thereof is meaningful when the vehicle 100 is traveling. Accordingly, if the vehicle 100 is stopped (i.e., pullover), the controller 202 terminates the output of the warning for notifying the releasing of the lane following assist mode of the vehicle 100.

\<Satisfaction of Lane Following Assist Mode Re-Entry Condition\>

If the state of the vehicle 100 and the surrounding environments satisfy the conditions for re-entry of the lane following assist mode, in other words, in response to all of the conditions of operations 304 and 306 of FIG. 3 described above are resolved, the controller 202 terminates the output of the warning for notifying the releasing of the lane following assist mode and activates the lane following assist mode again.

In addition to the conditions of operations 310 to 316 of FIG. 3, if the driver deactivates the warning generation in the a user setting mode or a failure guidance pop-up occurs due to a failure of the lane following assist system, the controller 202 may terminate the output of the warning for notifying the releasing of the lane following assist mode.

As such, because the output of the warning is terminated at an appropriate time after the output of the warning for notifying the releasing of the lane following assist mode is started, thereby the warning output time may be minimized.

As is apparent from the above, according to the exemplary embodiment of the disclosure, the frequency of releasing the lane following assist mode may properly maintained by applying the condition for releasing the lane following assist mode and the condition for generating the warning thereof at an appropriate level. Furthermore, the driver's fatigue caused by the warning generation may be minimized by appropriately adjusting the length of the warning generation time.

On the other hand, exemplary embodiment of the disclosures of the disclosure have thus far been described with reference to the accompanying drawings. It should be apparent to those of ordinary skill in the art that the disclosure may be practiced in other forms than the exemplary embodiment of the disclosures as described above without changing the technical idea or essential features of the disclosure. The above exemplary embodiment of the disclosures are only by way of example, and should not be interpreted in a limited sense.

What is claimed is:

1. A driving assistance control method for a vehicle, the method comprising the steps of:
    releasing a lane following assist mode in response to that a predetermined first condition for releasing the lane following assist mode is satisfied while the vehicle is traveling in the lane following assist mode;
    starting a warning to notify the releasing of the lane following assist mode in response to the lane following assist mode is released; and
    terminating the warning in response to that a predetermined second condition for terminating the warning is satisfied after the warning is started;
    wherein the predetermined second condition for terminating the warning comprises satisfying a re-entry condition of the lane following assist mode.

2. The method of claim 1, wherein the predetermined first condition for releasing the lane following assist mode comprises a predetermined traveling environment of the vehicle, excluding a driver's intention to release the lane following assist mode.

3. The method of claim 2, wherein the predetermined first condition for releasing the lane following assist mode comprises at least one of a lane non-recognition, a lane recognition reliability degradation, a failure to follow a preceding vehicle, a dissatisfaction with lane conditions, an activation of an automatic braking system, and a failure of steering system.

4. The method of claim 2, wherein the predetermined first condition for releasing the lane following assist mode comprises satisfying all conditions in which a driver releases his/her hands from a steering wheel (a hands-off state), a speed of the vehicle is equal to or greater than a predetermined speed, and the vehicle travels on a highway.

5. The method of claim 1, wherein the predetermined second condition for terminating the warning comprises that a predetermined time elapses after starting the warning.

6. The method of claim 1, wherein the predetermined second condition for terminating the warning comprises that a driver releases a steering wheel and then grabs the steering wheel again.

7. The method of claim 1, wherein the predetermined second condition for terminating the warning comprises that the vehicle stops traveling and stops.

8. A vehicle, comprising:
    a lane recognition sensor configured to recognize a lane of a road;
    a warning output means for outputting a warning; and
    a controller configured to:
    based on the result of lane recognition detected by the lane recognition sensor,
    release a lane following assist mode in response to that a predetermined first condition for releasing the lane following assist mode is satisfied while the vehicle is traveling in the lane following assist mode, start a warning to notify the releasing of the lane following assist mode in response to the lane following assist mode is released; and terminate the warning in response to a predetermined second condition for terminating the warning is satisfied after the warning is started;
    wherein the predetermined second condition for terminating the warning comprises satisfying a re-entry condition of the lane following assist mode.

9. The vehicle of claim 8, wherein the predetermined first condition for releasing the lane following assist mode comprises a predetermined traveling environment of the vehicle, excluding a driver's intention to release the lane following assist mode.

10. The vehicle of claim 9, wherein the predetermined first condition for releasing the lane following assist mode comprises at least one of a lane non-recognition, a lane recognition reliability degradation, a failure to follow a preceding vehicle, a dissatisfaction with lane conditions, an activation of an automatic braking system, and a failure of steering system.

11. The vehicle of claim 9, wherein the predetermined first condition for releasing the lane following assist mode comprises satisfying all conditions in which a driver releases his/her hands from a steering wheel (a hands-off state), a speed of the vehicle is equal to or greater than a predetermined speed, and the vehicle travels on a highway.

12. The vehicle of claim 8, wherein the predetermined second condition for terminating the warning comprises that a predetermined time elapses after starting the warning.

13. The vehicle of claim 8, wherein the predetermined second condition for terminating the warning comprises that a driver releases a steering wheel and then grabs the steering wheel again.

14. The vehicle of claim 8, wherein the predetermined second condition for terminating the warning comprises that the vehicle stops traveling and stops.

15. A driving assistance control method for a vehicle, the method comprising the steps of:
- releasing a lane following assist mode in response to that a predetermined first condition for releasing the lane following assist mode is satisfied while the vehicle is traveling in the lane following assist mode;
- starting a warning to notify the releasing of the lane following assist mode in response to the lane following assist mode is released; and
- terminating the warning in response to that a predetermined second condition for terminating the warning is satisfied after the warning is started,
- wherein the predetermined first condition for releasing the lane following assist mode comprises a predetermined traveling environment of the vehicle, excluding a driver's intention to release the lane following assist mode, and wherein the predetermined second condition for terminating the warning comprises that a predetermined time elapses after starting the warning, and that the vehicle stops traveling and stop;
- wherein the predetermined second condition for terminating the warning further comprises satisfying a re-entry condition of the lane following assist mode.

16. The method of claim 15, wherein
- the predetermined first condition for releasing the lane following assist mode comprises:
- at least one of a lane non-recognition, a lane recognition reliability degradation, a failure to follow a preceding vehicle, a dissatisfaction with lane conditions, an activation of an automatic braking system, and a failure of steering system, or satisfying all conditions in which a driver releases his/her hands from a steering wheel (a hands-off state), a speed of the vehicle is equal to or greater than a predetermined speed, and the vehicle travels on a highway, and
- the predetermined second condition for terminating the warning comprises that a driver releases a steering wheel and then grabs the steering wheel again.

17. A vehicle, comprising:
- a lane recognition sensor configured to recognize a lane of a road;
- a warning output means for outputting a warning; and
- a controller configured to:
- based on the result of lane recognition detected by the lane recognition sensor,
- release a lane following assist mode in response to that a predetermined first condition for releasing the lane following assist mode is satisfied while the vehicle is traveling in the lane following assist mode, start a warning to notify the releasing of the lane following assist mode in response to the lane following assist mode is released; and terminate the warning in response to a predetermined second condition for terminating the warning is satisfied after the warning is started,
- wherein the predetermined first condition for releasing the lane following assist mode comprises a predetermined traveling environment of the vehicle, excluding a driver's intention to release the lane following assist mode, and
- wherein the predetermined second condition for terminating the warning comprises that a predetermined time elapses after starting the warning, and that the vehicle stops traveling and stop;
- wherein the predetermined second condition for terminating the warning further comprises satisfying a re-entry condition of the lane following assist mode.

18. The vehicle of claim 17, wherein the predetermined first condition for releasing the lane following assist mode comprises at least one of a lane non-recognition, a lane recognition reliability degradation, a failure to follow a preceding vehicle, a dissatisfaction with lane conditions, an activation of an automatic braking system, and a failure of steering system, or satisfying all conditions in which a driver releases his/her hands from a steering wheel (a hands-off state), a speed of the vehicle is equal to or greater than a predetermined speed, and the vehicle travels on a highway, and the predetermined second condition for terminating the warning comprises that a driver releases a steering wheel and then grabs the steering wheel again.

* * * * *